Sept. 23, 1958 R. M. M. OBERMAN 2,853,552

TRUNKING DIAGRAM FOR AN AUTOMATIC TELECOMMUNICATION SYSTEM

Filed May 17, 1954 4 Sheets-Sheet 1

INVENTOR.
ROELOF M. M. OBERMAN
BY
Hugh A Kirk

Sept. 23, 1958 R. M. M. OBERMAN 2,853,552

TRUNKING DIAGRAM FOR AN AUTOMATIC TELECOMMUNICATION SYSTEM

Filed May 17, 1954 4 Sheets-Sheet 2

INVENTOR.
ROELOF M. M. OBERMAN
BY
Hugh A. Kirk

Sept. 23, 1958 R. M. M. OBERMAN 2,853,552

TRUNKING DIAGRAM FOR AN AUTOMATIC TELECOMMUNICATION SYSTEM

Filed May 17, 1954 4 Sheets-Sheet 3

INVENTOR.
ROELOF M.M. OBERMAN
BY
Hugh A Kirk

Sept. 23, 1958 R. M. M. OBERMAN 2,853,552

TRUNKING DIAGRAM FOR AN AUTOMATIC TELECOMMUNICATION SYSTEM

Filed May 17, 1954 4 Sheets-Sheet 4

INVENTOR.
ROELOF M. M. OBERMAN
BY
Hugh A. Kirk 2,853,552

TRUNKING DIAGRAM FOR AN AUTOMATIC TELECOMMUNICATION SYSTEM

Roelof Maarten Marie Oberman, Voorburg, Netherlands, assignor to Staatsbedrijf der Posterijen Telegrafie en Telefonie, The Hague, Netherlands Application May 17, 1954, Serial No. 430,340

Claims priority, application Netherlands May 23, 1953

12 Claims. (Cl. 179—18)

Figures 1, 5:
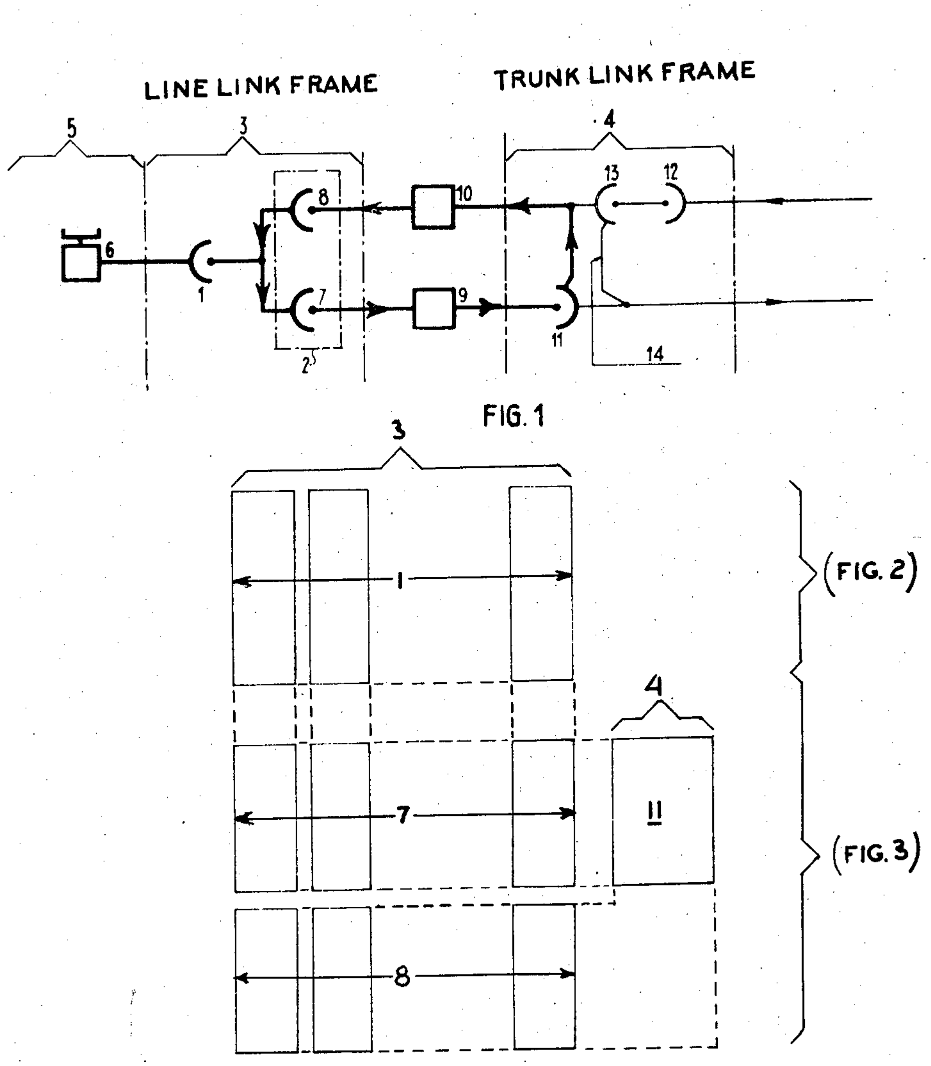

This invention relates to a trunking diagram for automatic telecommunication systems. More particularly, it deals with such a diagram for automatic telephone and telegraph systems in which the connection between two of a plurality of subscribers' lines in the system is connected through several selecting switching stages, more than one of which stages may be set up simultaneously under the control of a separate circuit, such as and including a register circuit. Such systems are commonly known as link systems and generally comprise a plurality of link circuits which connect the separate switching stages. Automatic switching systems of this type are disclosed in the Oberman copending applications Serial No. 300,806, filed July 25, 1952, and Serial No. 316,574, filed October 24, 1952.

The subscribers' lines, links, and selector switches in and between the stages of these systems are divided into main and sub groups so that they may be interconnected to permit the simultaneous selection of a predetermined minimum number of lines and links in the lowest, elementary, or sub group of subscribers to any other corresponding minimum number of lines and links in another similar sub group of subscribers.

Previously, such systems set up internal connections through each of the separate switching stages and connecting links in the same $n^{th}$ group of the line link frame from which the call started in an automatic exchange. With such connections starting from and returning to the same $n^{th}$ group of links, internal blocking occurs when the predetermined number of lines and links provided for that group are occupied.

It is an object of the present invention to provide an automatic switching system that decreases such internal blocking in a simple, effective, efficient and economical manner.

Another object is to produce such a system in which the degree of freedom between successive selectors of successive links in building up a connection is materially increased over that employed in the previously known systems.

Another object is to improve the systems of the above mentioned copending Oberman applications by materially reducing their internal blocking.

Another object is to produce such a system in which symmetry between the increased degrees of freedom of selection of different groups of lines in the system is maintained.

Another object is to produce such a system for simultaneously setting up a connection between a plurality of links connecting separate selecting stages in which a connection started in one main group may be completed in any other main group of lines in the system.

Generally speaking, the automatic switching system of this invention for connecting two of a plurality of subscribers' lines comprises incoming and outgoing primary and secondary selecting switching stages in each exchange, link circuits connecting each of the stages, connecting circuits for controlling the link circuits, and means such as register circuits for simultaneously controlling the operation of the link circuits and positioning of the selector switches in the selecting stages for setting up a call between two subscribers' lines of the switching system. In an exchange of such a system in order to increase the degrees of freedom between the secondary switches of the outgoing selecting stage and the secondary switches of the incoming selecting stage in the same line link frame, there is added a plurality of tertiary switches in a tertiary switching stage, which may be in a trunk link frame, which tertiary switching stage symmetrically distributes the sub groups of outgoing lines in one major group in the secondary switching stage of the line link frame among the incoming lines of other major groups of the secondary switching stage in said line link frame in the exchange. Thus, an exchange according to this invention may comprise a line link frame or frames having both the primary and secondary stages of both the incoming and outgoing selecting switches, and a trunk link frame or frames having the tertiary switching stage and two secondary switching stages for incoming lines from other exchanges and for tandem traffic through this exchange to other exchanges. The secondary switching stage in the line link frame, accordingly, has originating trunks connected to its outgoing selecting switches and terminating trunks connected to its incoming selecting switches. The tertiary switching stage in the trunk link frame thus directly divides the originating trunk lines from the outgoing selecting switches of the line link frame into terminating trunks for the same exchange or outgoing trunks for other exchanges; while the two secondary switching stages in the trunk link frame are for the distribution of incoming trunks from other exchanges which either are connected directly with the terminating trunks for this exchange and connected to the incoming switches of the secondary switching stage in the line link frame, or are connected directly to the outgoing trunks and traffic through this exchange for other exchanges.

These additional tertiary selecting switches of this invention are connected to separate connecting circuits and links which connect their inputs with the outgoing contacts of the outgoing secondary selector switches in the line link frame, and which connect their outputs with the incoming contacts of the incoming secondary selector switches in the line link frame. The outputs of the tertiary switches are also connected directly to the outgoing trunks to other exchanges. Thus, internal connections require four links to complete a connection between two subscribers' lines in that exchange, while outgoing connections to other exchanges require only two links, and incoming connections from other exchanges require three links. If the incoming switches in the trunk line frame have a sufficient number of output contacts more than required for both incoming and internal connection, they also may be connected for tandem traffic directly to other exchanges by-passing these tertiary switches. The tertiary switching stage of this invention accordingly is the partition between outgoing and incoming internal traffic of its exchange and adds an additional degree of freedom to the internal traffic of the exchange, thereby materially reducing internal blocking in the exchange itself.

In order to obtain symmetry in distributing the numbers of links provided for a given number of subscribers' lines in a sub group in the system, through this tertiary switching stage, it is desirable that the number of links of each sub or elementary group of subscribers' lines be equal to and at most not more than the number of connecting circuits or selector switches in each sub group in the system. With this in mind any system may be predetermined to fit the desired connection symmetry of the present invention. In carrying out this symmetry, all of the contacts from the first lines of each sub group in a main group of lines are connected through the tertiary switches to the first sub group of each of the other main groups in the system, and correspondingly the second lines in each sub group of the same main group are connected through the tertiary switches to the second sub group of each of the other main groups in the system, etc., throughout the system. If more connecting circuits than elementary links are employed, these additional connecting circuits may be distributed according to an independent pattern through further additional tertiary switches provided for the purpose.

The types of selector switches which may be employed in the system of this invention include not only standard step-by-step and rotary type selector type switches, but more particularly crossbar selector switches, electronic switches, tubes and rectifiers, special tubes such as cold cathode tubes having two groups of crosswise placed electrodes, and the like.

Figure 2:
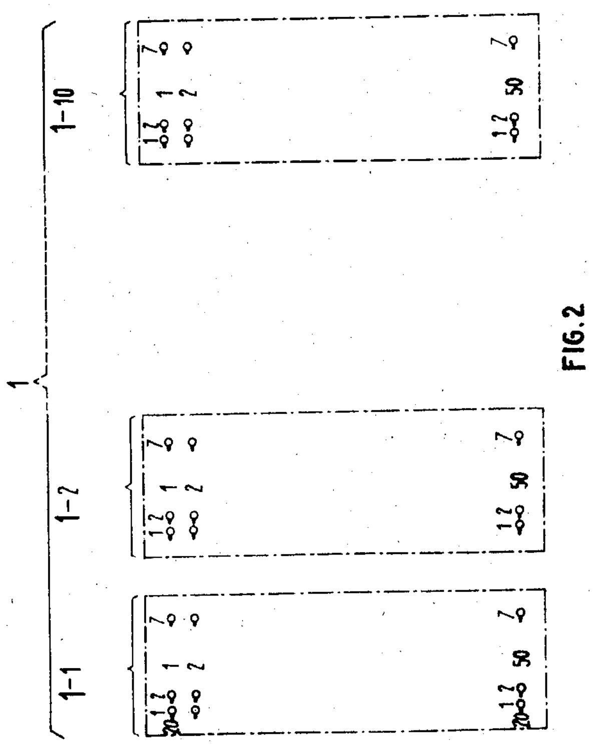
Figure 3:
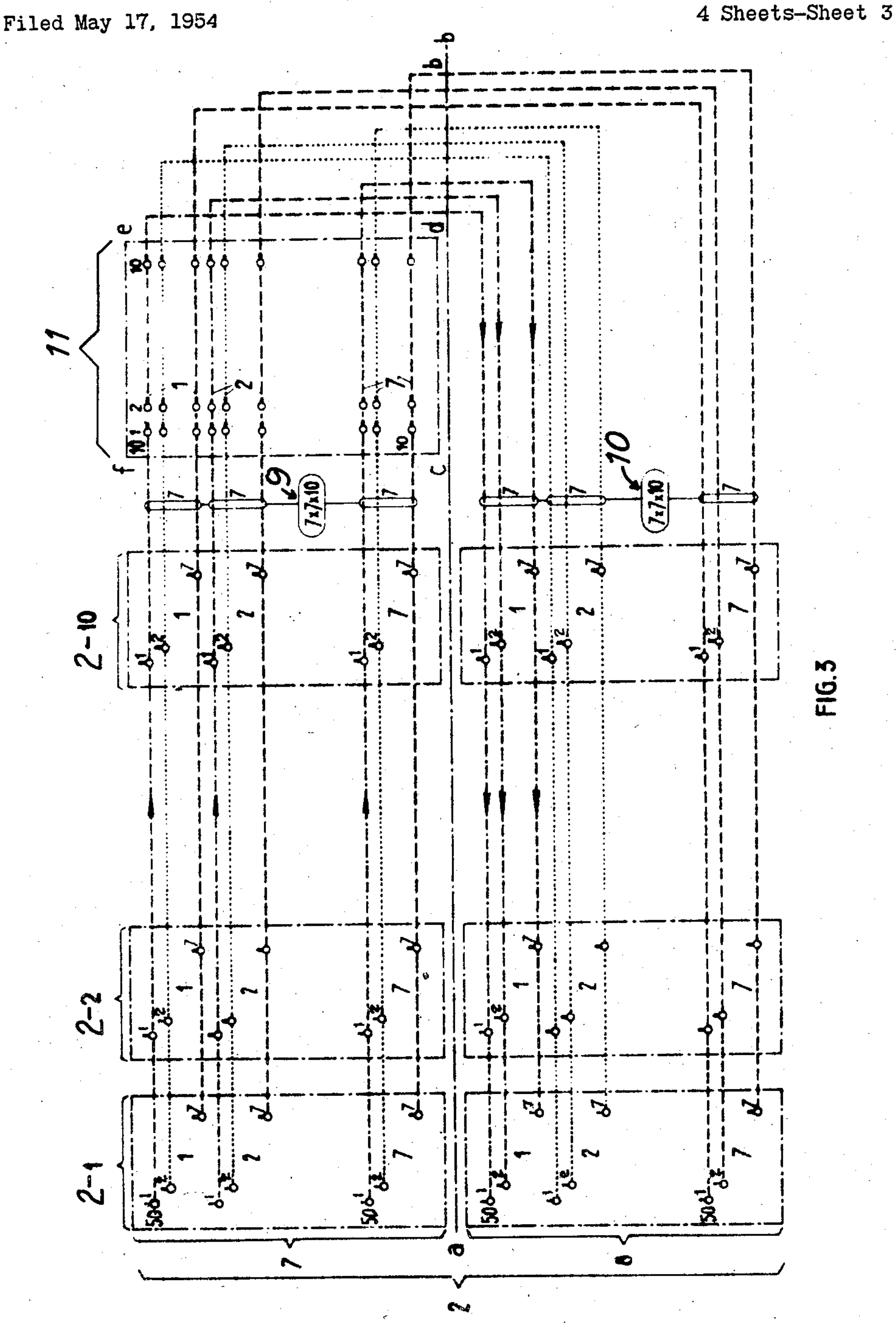
Figure 4:
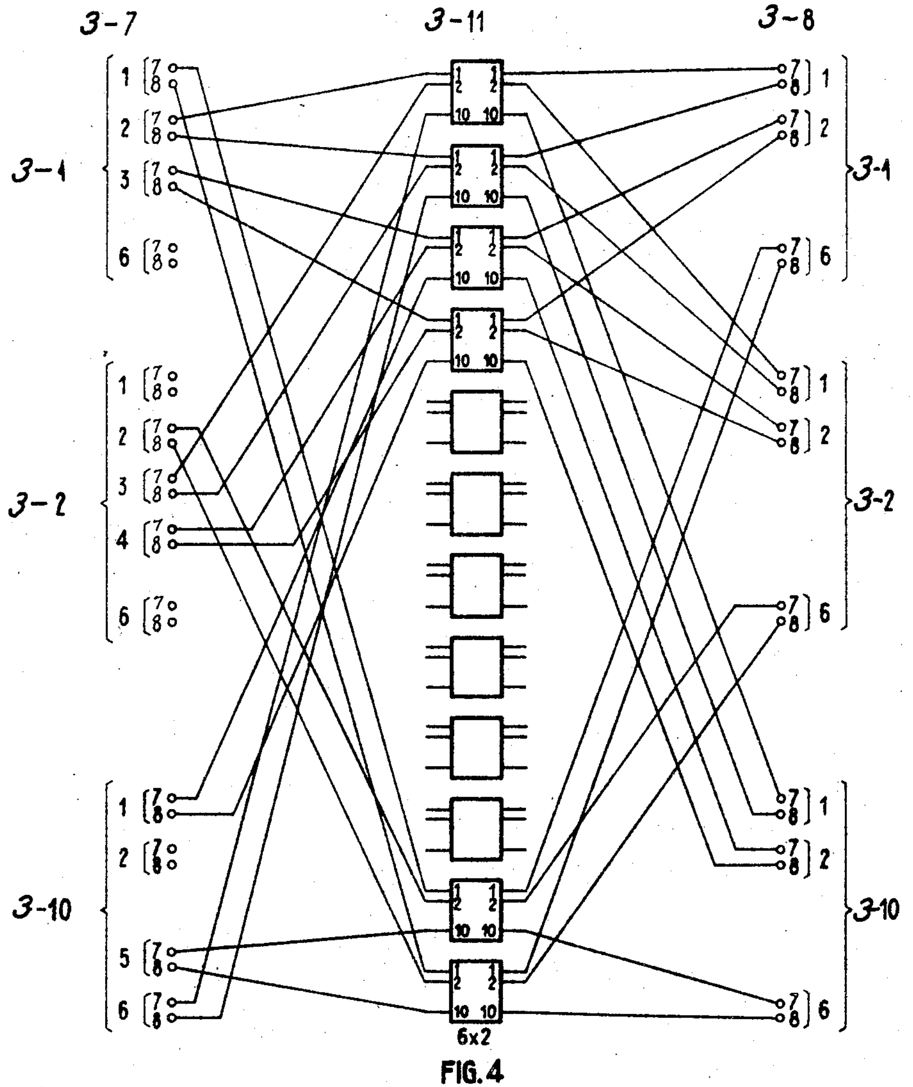

The above mentioned and other features and objects of this invention and the manner of attaining them will become more apparent and the invention itself will be best understood by reference to the following description of embodiments of the invention taken in conjunction with the accompanying drawings, wherein:

Fig. 1 is a schematic block trunking diagram of a four link automatic switching system showing in heavy lines how an internal connection in an exchange is set up through a tertiary switching stage according to this invention;

Figs. 2 and 3 combined (as shown in Fig. 5) illustrate an Ericsson type of schematic trunking diagram directed only to the heavy line connections shown in the diagram of Fig. 1, to illustrate the symmetric grouping of the lines of the sub-groups in the main groups of an ideal system; with Fig. 2 representing the primary switching stage and Fig. 3 representing the secondary and tertiary switching stages;

Fig. 4 is a block schematic trunking diagram of only that part of an unbalanced distributing system, which shows symmetrical connections through additional tertiary switches for the additional connecting circuits over the number equal to the number of elemental links, which diagram may be employed together with the connections of the ideal arrangement shown in Fig. 3 for completing an unbalanced exchange; and Fig. 5 illustrates with blocks how the Ericsson diagrams of Figs. 2 and 3 should be relatively arranged to conform to the complete heavy line circuit shown in Fig. 1.

The schematic trunking diagram in Fig. 1 shows a system having a line link frame 3 and a trunk link frame 4 defined between parallel vertical dot-dash lines. The line link frame 3 consists of a primary switching stage 1 and a secondary switching stage 2, the secondary switching stage being divided into outgoing switches 7 and incoming switches 8. The subscribers' sets 5 are connected by subscribers' lines 6 to the terminals of the primary switching stage 1. The outgoing and incoming connecting circuits 9 and 10, respectively, are connected to the incoming and outgoing selector switches 7 and 8 in the secondary switching stage 2. The outgoing connecting circuits 9 serve both internal traffic as well as outgoing traffic to other exchanges, and are therefore connected to the trunk line frame 4 which frame contains a tertiary switching stage 11. This switching stage 11 divides or partitions outgoing calls to other exchanges from the internal calls back into the same exchange: the internal calls being directed as shown by the heavy lines to the incoming connecting circuit 10, and the outgoing calls to the output terminals of the tertiary switching stage 11 connected directly to outgoing trunks to the other exchange being called.

Thus, an internal connection from one subscriber's set 5 to that of another follows four links, namely, (1) from the primary switching stage 1 to the secondary stage

2 of outgoing switches 7 of line link frame 3, (2) from outgoing switches 7 through connecting circuit 9 to tertiary switching stage 11 in the trunk link frame 4, (3) from tertiary switching stage 11 through connecting circuit 10 back to secondary switching stage 2 of incoming switches 8 of line link frame 3 again, and (4) from incoming switches 8 back to the primary switching stage 1 of the same line link frame 3.

An outgoing connection to another exchange, however, only passes through two links, namely, (1) from primary switching stage 1 to the outgoing switches 7 of the secondary switching stage 2 of line link frame 3, and then (2) from outgoing switches 7 through outgoing connecting circuit 9 to the tertiary switching stage 11 in the trunk link frame 4, and thence directly to the outgoing trunk to the other exchange. Incoming connections or trunks terminating in this exchange from other exchanges, however, pass through three links, namely, (1) the link between the two switching stages 12 and 13 of the trunk link frame 4, (2) from the trunk link frame incoming switches 13 through connecting circuit 10 to incoming switches 8 of secondary switching stage 2 of the line link frame 3, and (3) from incoming switches 8 of secondary switching stage 2 to primary switching stage 1 in the line link frame 3. An additional connection 14 may also be shown connected between the outgoing and incoming trunks in the trunk link frame 4, if the switches of stage 13 have a sufficient number of positions to take care of tandem traffic from other exchanges through this exchange to still other exchanges.

The addition of the tertiary switching stage 11 in the trunk link frame 4 of an exchange, not only provides a means for a separation between outgoing exchange traffic and internal exchange traffic, but also provides an additional degree of freedom between the different main groups of the lines and links in this exchange of line link frame 3, by symmetrically distributing the lines from the output of the tertiary switching stage 11 to the different main groups of connecting circuits 10 in this said exchange.

*An ideal symmetrical arrangement*

For the purposes of illustration of an ideal symmetrical arrangement and distribution of subscribers' lines, links, and switches in an automatic switching system, a system having ten thousand subscribers' lines has been selected comprising in its primary switching stage 1 in Fig. 2 ten major groups of one thousand lines each, each major group comprising fifty sub or elementary groups of seven multipled twenty-point selector switches. Each selector switch is represented by a small circle dot with a tail in the major group dot-dash line rectangles 1–1, 1–2 . . . 1–10. (This particular type of diagram shown in Figs. 2 and 3 is described in the article entitled "L. M. Ericsson Crossbar Switch System in Helsinki" by Dr. S. A. Karlsson, published in "The Ericsson Review," No. 4 (1950), pages 106 through 115.)

Fig. 3 discloses the secondary switching stage 2 comprising ten main groups 2–1, 2–2 . . . 2–10 of outgoing selector switches 7 and incoming selector switches 8, each of which main groups comprises seven sub-groups of seven fifty-point selector switches, with the outgoing groups of switches being connected to the incoming groups of switches through the tertiary switches 11 in the tertiary switching stage represented by the dot-dash rectangle *c—d—e—f*. A practical idea of the diagram of Fig. 3 may be obtained by holding it along the center line *a–b* and then the switches covering each other belong to the same group. The distribution and interchange of sub groups in each and different main groups is made in the connections of the outgoing secondary switches to the inputs of the tertiary stage switches. However, none of the incoming and outgoing circuits to and from other exchanges are disclosed in Fig. 3.

In the herein chosen example in order to obtain the same grade of service corresponding to seven links for each twenty subscribers in fifty sub groups per thousand, that is, $p$ (the blocking probability) = 0.1%, there will have to be approximately fifty incoming and fifty outgoing connecting circuits per thousand subscribers' lines, which herein has been provided by having seven links for each of seven groups or forty-nine links for each thousand subscribers' lines.

Referring now to the dotted and dashed selector switch connecting lines shown in Fig. 3, it can be seen from the first sub group of seven switches in the first main group 2–1 of outgoing secondary stage 7 are connected in parallel with the same first sub group of switches in each of the other outgoing stage 7 main groups 2–2 . . . 2–10 through seventy separate connection circuits to and through the tertiary switches 11 (which are divided into seven groups of seven switches taken ten plus ten times) and then on to the first switch of each of the seven sub groups of switches in the incoming secondary stage 8 distributed over the ten main groups 2–1, 2–2 . . . 2–10. And similarly each of the seven switches in the second sub group of outgoing selector switches of each main group are connected through the tertiary switching stage 11 to the second switch of each of the seven separate sub-groups of the incoming selector switches of each main group; and so on through the seven sub-groups of the main groups.

In other words, the $n^{th}$ sub group of outgoing connecting circuits or links 9 of a main group 2–1, 2–2 . . . 2–10 always handles traffic offered from the $n^{th}$ link of each elementary group of twenty subscribers' lines of a major group, but these outgoing links are connected to the tertiary switches 11 situated in different sub-groups of the original same main group and may be also of a different main group. This is done in such a way that the single $m^{th}$ connecting circuit of this incoming $n^{th}$ sub-group is connected to a switch of the $m^{th}$ sub-group of tertiary switches of a main group for its outgoing circuit. Thus, for example, a connection beginning from a calling subscriber's line in the second sub group of internal links of the line link frame 3 can be completed via a second sub-group of connecting circuits to the fifth (or any other) sub group of tertiary switches and from there via a fifth sub group of incoming secondary switches of the line link frame and via a fifth sub group of internal links of that frame to the called subscriber. This amounts to the removal of considerable limitation and internal blocking in the establishment of connections in automatic telecommunication systems which automatically set up simultaneously a plurality of links for a connection between a calling and called subscriber.

The symmetry of this trunking diagram shown in Figs. 2 and 3, not only enables internal connections between a calling and called subscriber to be established via the outgoing and incoming secondary switches of the line link frame, but, if suitable switching over of the metering wire is introduced, also via the incoming and outgoing secondary switches of the line link frame 3 (in Fig. 1). Accordingly, the orders of sequence of the diagram may not be inverted.

According to the diagram of Fig. 3 the number of links per elementary group of twenty subscribers is equal to the number of connecting circuits or selector switches in a sub group, and if the latter number is smaller than the former the ideal switching system just described cannot fully be carried out. However, with this criterion of equality kept in mind, it will not be difficult to design the best possible trunking diagram for successive switching stages of any given exchange.

*An unbalanced arrangement*

If the number of links per elementary or sub group of subscribers' lines is smaller than the number of connecting circuits in a sub group, the switching system just described can be applied to that part of said connecting circuits which equals the number of said links, and the additional connecting circuits per sub group may then be separately inter-connected and distributed as evenly as possible among all the sub groups of the secondary stage switches through additional tertiary switches added specifically for this purpose. An example of such an unbalanced system is partly shown in Fig. 4, which switching system has six links for each elementry or sub group of subscribers' lines, while the number of switches or connecting circuits in a sub group of secondary switches is eight, or greater than six. In such a system six of the eight secondary stage switches 7 and 8 of all the sub groups can be connected symmetrically in the manner just described. However, the additional switches and connecting circuits, namely, two times six for each main group of a thousand subscribers' lines and ten times this for a ten thousand line exchange, may be divided into twelve sub groups of ten tertiary switches 3–11 inter-connected to the additional two switches 7 and 8 as shown along the right side of Fig. 4. Fig. 4 accordingly refers to a symmetrical way in which only the additional connecting circuits and switches may be connected through an additional twelve sub-groups of tertiary switches for distribution through ten main groups 3–1, 3–2 . . . 3–10 of both outgoing and incoming secondary switches 3–7 and 3–8. Fig. 4 thus shows the outlets of the outgoing secondary switches 3–7, boxes for the sub groups of twelve tertiary switches 3–11, and the inlets of the incoming secondary switches 3–8, with the trunk lines connecting the indicated numbers of the switches in a systematic order similar to that employed in the ideal arrangement described above.

It should be noted that the connection between the secondary and tertiary switches may also be carried out by applying four times the diagram according to Fig. 4 without also using the system according to Figs. 2 and 3 previously mentioned. Such an arrangement according to Fig. 4 would cause some limitation because it is not possible to establish connections employing links having equal numbers in the line link frame, if subscribers are concerned, which are connected to the same elementary group of primary switches.

The principle according to Fig. 4 can be applied to any system in which the number of primary switches serving an elementary group is smaller than, equal to, or even by one larger than the number of secondary switches in a sub group, while the system shown in Figs. 2 and 3 is limited only to those systems in which an equal number of secondary switches, or connecting circuits and links in each elementary or sub group, are provided throughout the system.

While there is described above the principles of this invention in connection with specific apparatus, it is to be clearly understood that this description is made only by way of example and not as a limitation to the scope of this invention.

I claim:

1. In an automatic telecommunication switching system having a plurality of subscribers' lines, any one of which may be connected to any other, and having an exchange comprising: link frames having incoming and outgoing multiple contact switches, a line link frame, a trunk link frame, connecting circuits for originating trunk lines between the outgoing switches of the secondary switching stage of said line link frame and said trunk link frame, other connecting circuits for terminating trunk lines between said trunk link frame and the incoming switches of the secondary switching stage of said line link frame, and incoming and outgoing trunks to and from said exchange from and for other exchanges connected to said trunk link frame, the improvement comprising: an additional switching stage in said trunk link frame connected directly between said connecting circuits for said originating trunks from said outgoing switches and both said other connecting circuits for said terminating trunks connected to said incoming switches and said outgoing trunks to other exchanges, and means for controlling said additional switching stage to divide in said exchange the internal traffic to said exchange from the outgoing traffic to other exchanges, whereby an additional degree of selection freedom for internal traffic between said incoming and outgoing switches of said line link frame is obtained for reducing internal blocking in said exchange.

2. A system according to claim 1 wherein said connecting circuits between said additional switching stage and said outgoing and incoming switches of said secondary switching stage of said line link frame are symmetrically distributed between said secondary switching stage switches.

3. A system according to claim 1 including means in said trunk link frame for connecting incoming trunks from other exchanges to said other connecting circuits for said terminating trunks connected to said incoming switches of said line link frame.

4. A system according to claim 3 wherein said means in said trunk link frame for connecting incoming trunks from other exchanges to said connecting circuits of said terminating trunks includes means also for connecting said incoming trunks for other exchanges directly to said outgoing trunks from said trunk link frame in this said exchange.

5. In an automatic link switching system of exchanges between a plurality of subscribers' lines divided into main and sub-groups in each exchange, each exchange having both primary and secondary incoming and outgoing switching stages divided into said groups for terminating and originating trunks respectively, each exchange having both outgoing and incoming trunks connecting it with the other exchanges of said system, and register circuit means for setting up a connection between two of said lines, the improvement comprising: a tertiary switching stage between the outgoing and incoming secondary switching stages of each exchange, separate connecting circuits to and from said tertiary switching stage connected to said outgoing and incoming switching stages for said originating and terminating trunks for that exchange, respectively, said connecting circuits and said tertiary switching stage being controlled by said register circuit means to distribute symmetrically the sub-groups of each outgoing switching stage among different sub-groups of said incoming switching stages as well as to divide the originating trunks to said incoming switching stages of that exchange from the originating trunks for other exchanges, by directly connecting the latter originating trunks to the outgoing trunks from that exchange through said tertiary switching stage, whereby internal blocking of said system is reduced.

6. A system according to claim 5 wherein said register circuit means includes means for setting up a connection between two of said lnes to at least two of said switching stages simultaneously.

7. In an automatic link switching system between a plurality of subscribers' lines divided into main and sub-groups in a given exchange and having both primary and secondary incoming and outgoing switching stages divided into main and sub-groups for terminating and originating trunks in said exchange, and register circuit means for setting up a connection between two of said lines, the improvement comprising: a tertiary switching stages between said outgoing and incoming secondary switching stages for said terminating and originating trunks in said exchange, separate connecting circuits to and from said tertiary switching stage connected to said outgoing and incoming switching stages for said originating and terminating trunks respectively, said connecting circuits and said tertiary switching stage being controlled by said register circuit means to distribute symmetrically the sub-groups of said incoming switching stages, whereby internal blocking of said exchange is reduced.

8. In an automatic link switching system of exchanges between a plurality of subscribers' lines divided into main and sub-groups in each exchange, each exchange having both primary and secondary incoming and outgoing switching stages for both terminating and originating trunks respectively, each exchange having both outgoing and incoming trunks connecting it with the other exchanges of said system, said primary and secondary incoming and outgoing stages also being divided into main and sub-groups of switches, register circuit means for setting up a connection between two of said switching stages simultaneously, and incoming and outgoing trunks to and from said exchanges, the improvement comprising: a tertiary switching stage between said outgoing and incoming secondary switching stages in each exchange for said originating and terminating trunks respectively, separate connecting circuits to and from said tertiary switching stage connected to said outgoing and incoming switching stages through said originating and terminating trunks respectively, said connecting circuit being controlled by said register circuit means, said tertiary switching stage also being directly connected to said outgoing trunks, said register circuit means controlling said tertiary switching stage to divide said originating trunks into the terminating trunks for said exchange and the outgoing trunks for other exchanges, as well as to distribute symmetrically the sub-groups of said divided terminating trunks among different sub-groups of said incoming switching stages, whereby internal blocking in said system is reduced.

9. A system according to claim 5 having in each exchange a line link frame and a trunk link frame, said primary and secondary switching stages being mounted in said line link frame and said tertiary switching stage being mounted in said trunk link frame.

10. A system according to claim 5 wherein in one exchange the number of primary switches serving a sub-group is at most by one larger than the number of secondary switches in a sub group.

11. A system according to claim 5 wherein in one exchange the number of primary switches serving an elementary sub-group is equal to the number of secondary switches in a sub group.

12. A system according to claim 5 wherein in one exchange each of the sub groups of outgoing secondary switches of a main group serving the $n^{th}$ set of connecting circuits leading to the sub groups of primary switches of the same main group is connected to an inlet of another sub group of tertiary switches, the outlets of said tertiary switches being connected to the inlets of incoming secondary switches located in a different main group serving the $m^{th}$ set of connecting circuits between the incoming secondary switches and primary switches of said other main group, thereby producing an additional degree of freedom between said incoming and outgoing switching stages in said one exchange.

References Cited in the file of this patent

UNITED STATES PATENTS

| | | |
|---|---|---|
| 2,585,904 | Busch | Feb. 19, 1952 |
| 2,674,657 | Bellamy | Apr. 6, 1954 |
| 2,710,893 | Boyer | June 14, 1955 |
| 2,761,907 | Gohorel | Sept. 4, 1956 |